Figure 1B:
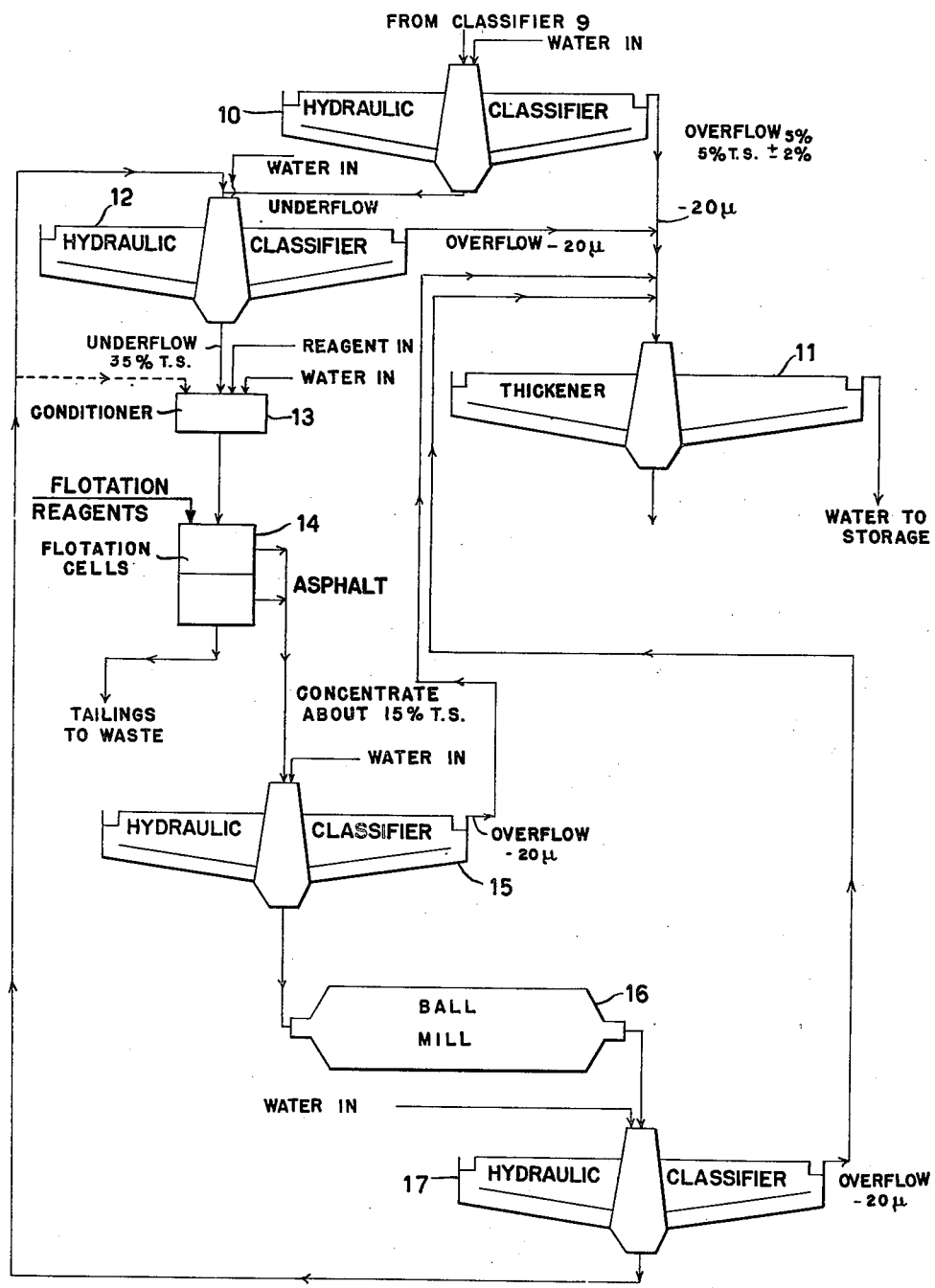
Figure 1C:
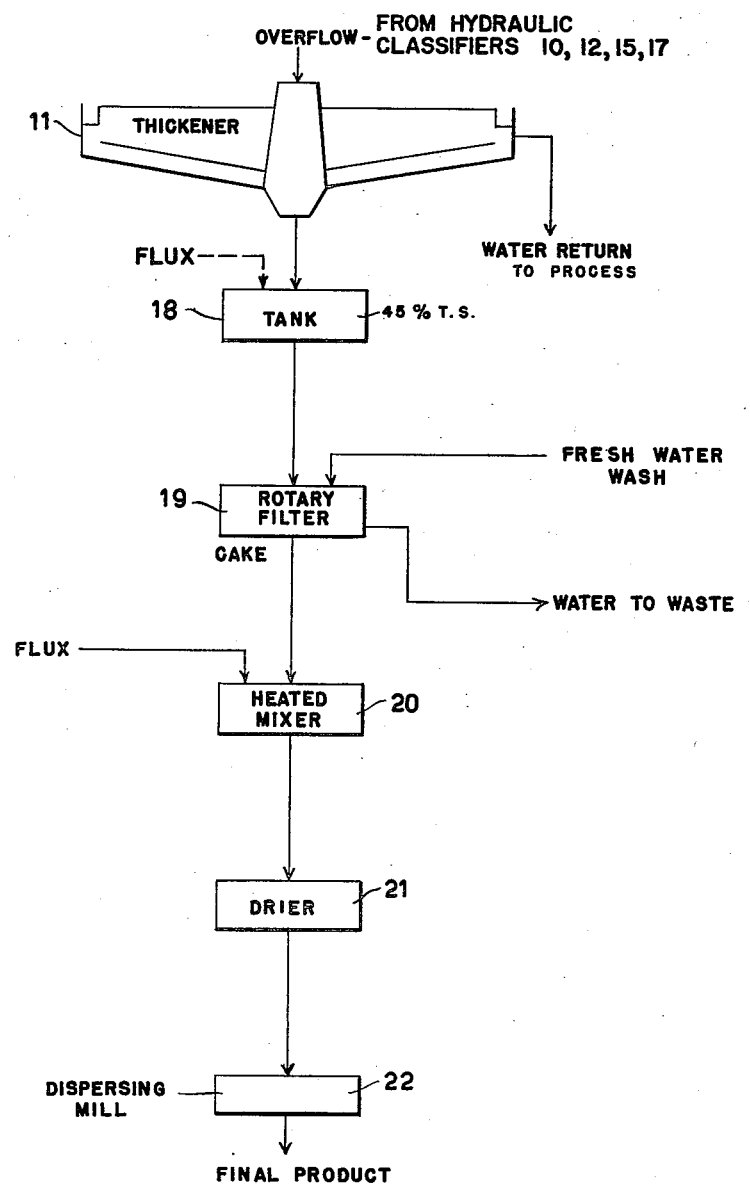

April 29, 1952   H. C. HOWELL   2,594,929
METHOD FOR REFINING TRINIDAD LAKE ASPHALT
Filed July 14, 1948   3 Sheets-Sheet 1
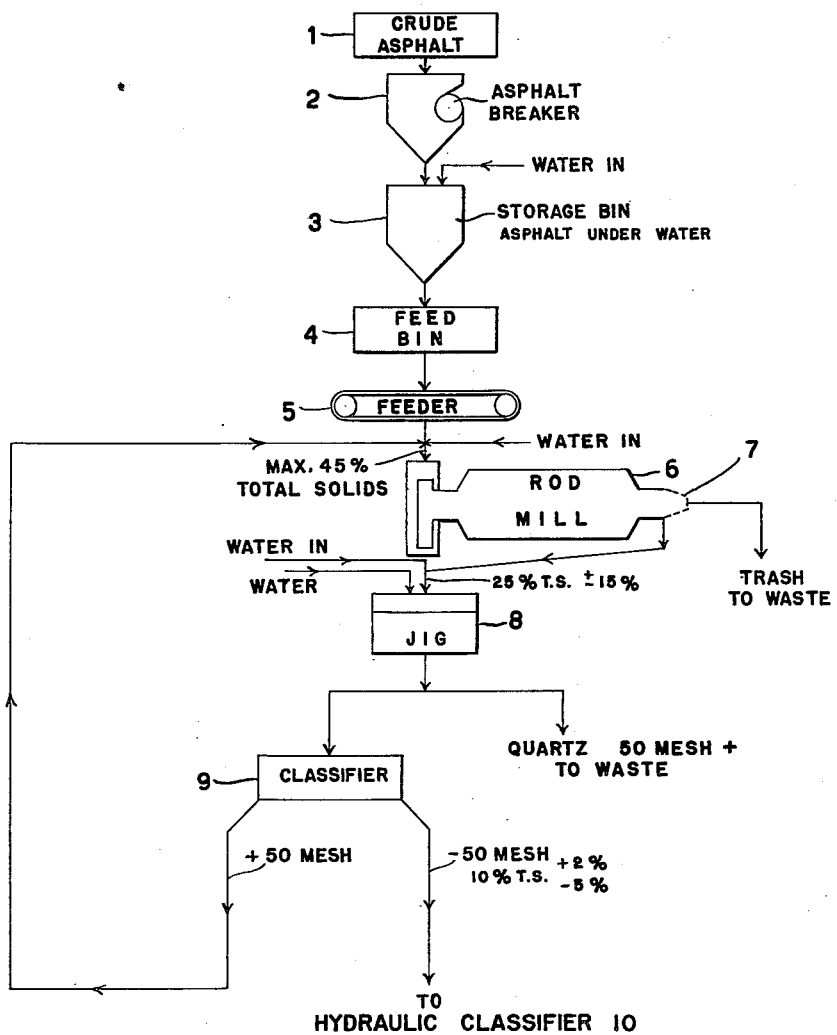
FIG. IA.
INVENTOR.
Henry Clay Howell
BY
ATTORNEYS April 29, 1952     H. C. HOWELL     2,594,929
METHOD FOR REFINING TRINIDAD LAKE ASPHALT
Filed July 14, 1948

INVENTOR.
Henry Clay Howell

UNITED STATES PATENT OFFICE 2,594,929

METHOD FOR REFINING TRINIDAD LAKE ASPHALT

Henry Clay Howell, Rahway, N. J., assignor to Barber Oil Corporation, New York, N. Y., a corporation of Delaware Application July 14, 1948, Serial No. 38,682

13 Claims. (Cl. 241—24)

This invention relates to a method for refining Trinidad Lake asphalt. More specifically, the desired refinement is obtained, according to the method of this invention, essentially through the use of water as compared with the use of solvents or heating as heretofore.

Crude Trinidad Lake asphalt, as is well known, comprises bitumen or asphalt with which is admixed mineral matter comprising in the main clay and silica, the balance comprising in the main various vegetable matter and water usually in the form of a saline solution.

The clay and much of the silica contained in Trinidad Lake asphalt are respectively highly advantageous and disadvantageous to the commercial uses of the asphalt. Thus, as is well known, the clay, in particles of colloidal size, imparts to the asphalt properties variously well known, which are desirable in commercial uses of the asphalt. On the other hand, the silica of the larger particle sizes, is disadvantageous in commercial use, more particularly in that it exerts a cutting action on various apparatus, as pumps, valves, etc., in which the asphalt is desirably handled in a fluid state. Thus, the objectionable silica consists, in the main, of quartz most of the particles of which have a diameter of 20 microns or greater, the unobjectionable silica having particles 10 microns or less in diameter. The amount of silica having particles greater in diameter than 10 microns but less than 20 microns is negligible for practical purposes.

Thus, for a desirably refined Trinidad Lake asphalt the water and larger particles of vegetable matter must be removed, the clay content retained and the silica of effectively large particle size removed. A desirably refined Trinidad Lake asphalt will contain in suspension substantially all of the original clay naturally contained by the crude and will contain in suspension other mineral matter of the crude, especially silica, of a particle size not larger than about 10 microns, the total mineral matter amounting to not in excess of about 30% by weight of the refined asphalt.

The refining of Trinidad Lake asphalt for the removal of vegetable matter and water presents no great problem and such has been customarily accomplished satisfactorily by heating the crude asphalt to a temperature sufficiently high to liquefy it, thus effecting removal of the water by vaporization, and effecting removal of vegetable matter by skimming or screening.

Such procedure, however, is not at all effective for the removal of undesirable silica.

Procedure for the removal of undesirable silica, involving solution of the crude asphalt in a solvent followed by centrifugation or settlement and recovery of the refined asphalt from solution, has been suggested and goes a long way toward the production of a desirably refined product. However, such procedure is open to objection in that elimination of silica particles above a small minimum size is difficult of accomplishment, substantial loss of bitumen occurs, very substantial expenses are involved in effecting solvent recovery and in unavoidable loss of solvent. Such procedure is further objectionable because of an undesirable reduction in the clay content of the asphalt due to the fact that a proportion of the clay content of the crude is in the form of balls or agglomerates, which variously contain bitumen but which behave in the treatment like silica of the larger particle sizes and consequently are separated from the solution with the undesirable silica, resulting in the loss of clay and bitumen.

Now in accordance with this invention a method is provided by which Trinidad Lake asphalt may be treated for the production of a desired refined product, such as is specified above, at a minimum of cost, without reduction of the crude asphalt to a fluid state by heating, without the use of solvent, and without any consequential loss of original bitumen or original clay content of the crude.

Generally speaking the method in accordance with this invention involves the treatment of crude Trinidad Lake asphalt for the hydraulic separation of mineral matter, other than clay, and essentially the silica, of undesirably large particle size from the bitumen and clay and recovery of the refined asphalt free from free water and fluxed as may be desired.

More specifically, as will appear in detail hereinafter, the method according to this invention involves subjecting the crude asphalt in the presence of water to repeated grinding operations, to free the larger particles of silica, and to break up balls or agglomerates of clay particles alternately with repeated treatments for the separation from the bitumen and clay of particles of mineral matter, essentially silica, of undesirably large size.

In carrying out the method of this invention either fresh water or salt water, as sea water, may be used.

Having now indicated, in a general way, the nature and purpose of this invention, I will proceed to a detailed description of a practical application thereof to the refining of Trinidad Lake asphalt with reference to the accompanying sheets of drawings denoted 1A, 1B and 1C and which together constitute a flow sheet illustrative of procedure and apparatus.

As illustrated by sheet 1A, crude Trinidad Lake asphalt from any convenient source 1 is passed through a breaker or crusher 2 into a storage bin 3 in which it is stored under water. The breaker 2 will desirably reduce the crude asphalt to pieces of a size of say ¼ in. to ½ in. mesh.

Broken asphalt from storage bin 3 will pass from the storage bin into the feed bin 4 and from thence will be fed, as by a feeder 5, into a rod mill 6. Water will be fed into the rod mill 6 with the broken asphalt to bring the feed to the rod mill to not in excess of about 50% total solids content and preferably to about 45% total solids content.

Here it may be stated that the milling carried out at this point in the rod mill 6 and in subsequent milling operations, as will be described hereinafter, will be carried out at a total solids content of not in excess of about 50% and preferably about 45% total solids content. Minimum total solids content at which milling is carried out is not critical except to the extent that the greater the dilution the larger the mill required and the more and undesirable grinding of coarse mineral matter will occur.

The function of the rod mill will be to effect a milling of the crude asphalt to reduce its particle size, with release of vegetable matter of relatively large particles and of mineral matter, essentially silica, of large particle size while avoiding further reduction in particle size of the released silica, thus effecting a selective grinding.

The effluent from the rod mill will be discharged through a trash screen 7, (which will remove such trash as sticks, and the like, which will be discharged to waste), and thence to a jig 8, of any usual construction, and which may be, for example, a Denver mineral jig, with the addition of water to bring the feed to the jig to a total solids content of about 10%–40%, preferably 25%.

The jig 8 will serve to separate particles of silica of a size of 50 mesh and greater, such as quartz, from the asphalt. The separated quartz will be passed to waste and the asphalt, together with water, will be passed to a classifier 9, which may be, for example, a rake classifier. In place of jig 8, a concentrating table, for example, a Wilfley table, may be used.

The classifier 9 will be adjusted so as to effect a separation of the mass under treatment into a portion comprising particles of a size greater than about 50 mesh, which portion will be returned to the rod mill 6 for remilling, and a portion comprising particles of a size less than 50 mesh and of a concentration of about, for example desirably 10% total solids, which portion will be delivered to a hydraulic classifier 10 (sheet 1B) of any usual and well known upflow type, such as is described in "Handbook of Non-ferrous Metallurgy" by D. M. Liddell, McGraw-Hill Book Co., 1945, pp. 102 and 114, and as exemplified by a Dorr Company Hydroseparator, together with water in quantity with respect to the adjustment of the hydraulic classifier to bring the total solids in the overflow therefrom down to about 3%–10%, and preferably about 5%.

Here it may be stated that the various hydraulic classification steps involved in the method will be carried out at a total solids content such that the overflow will have a total solids content of 3%–10%, and preferably about 5%.

Continuing now, with reference to sheet 1B, the hydraulic classifier 10 will be so adjusted with respect to the total solids content of the feed thereto and the rate of overflow of water therein, as to effect separation, from the mass under treatment, of particles of a size of less than 20 microns quartz equivalent in the overflow from the hydraulic classifier, which overflow will have a solids content of about 3%–10%, preferably about 5%, and will pass to thickener 11, for example of the continuous type. The particles passing to the thickener 11 will comprise bitumen of particle size of less than 20 microns "quartz equivalent" and containing original colloidal clay, but will be free from any silica particles and agglomerated particles of clay of undesirably large size, as, for example, larger than about 10 microns. The material passing from the hydraulic classifier 10 to the thickener 11 will comprise an increment of the end product of the method the working up of which will be described hereinafter.

The underflow from the hydraulic classifier 10, carrying about 30% total solids, comprising bitumen, silica and clay balls, most of which are of particle size of 20 microns "quartz equivalent" or larger, will pass to a second hydraulic classifier 12 together with added water. The hydraulic classifier 12 will be adjusted, as is the hydraulic classifier 10, so that the overflow will carry particles of less than 20 micron "quartz equivalent" size. The overflow from the hydraulic classifier 12 will pass to the thickener 11 as a further increment of the end product of the method.

Here it will be noted that separation from the mass introduced into hydraulic classifiers 10 and 12 of particles of quartz of a size smaller than 20 microns results in a separation also of bitumen and colloidal clay from clay balls, all of which will have different sizes dependent upon their respective shapes, masses and specific gravities and that whatever their actual sizes may be they are considered as the size that a particle of quartz would have to be to react in the same manner. This size is herein referred to as "quartz equivalent."

The underflow from the hydraulic classifier 12, containing about 35% total solids, passes to a conditioner 13 for the addition of water and one or more flotation reagents, such, for example, as xylol, kerosene oil, pine oil, cresylic acid, tetrasodium pyrophosphate, glassy sodium phosphates, or the like, in amount such as is generally used in froth flotation, and thence to a battery of froth flotation cells 14.

While the flotation cells 14 are shown in the flow sheet as a single group, it will be understood that, if desired, cleaner and/or scavenger cells may be used, in which case the cells shown will act as rougher cells.

The concentrate from the flotation cells 14 carrying about 15% total solids, comprising bitumen with small quantities of clay balls and silica which have adhering to them substances, as, for example, bitumen, which cause them to float, passes, with added water, to a hydraulic classifier 15, while the tailings, principally silica, of undesirably large particle size, pass to waste.

The hydraulic classifier 15 is adjusted, as are the hydraulic classifiers 10 and 12, so that the overflow, which passes to the thickener 11 carrying solids of a particle size of less than 20 microns, "quartz equivalent," comprises a further increment of the end product of the method.

The underflow from the hydraulic classifier 15, carrying bitumen and silica of particle size greater than about 10 microns and clay balls passes to a ball mill 16.

The ball mill 16 acts to break up particles of bitumen of a size of 20 microns "quartz equivalent" and larger and release, or separate, particles of silica adherent to, or encased by, bitumen and to break up clay balls.

The overflow from the ball mill is passed, with added water, to a hydraulic classifier 17 adjusted, as are the hydraulic classifiers 10, 12 and 15, so that the overflow will carry particles of a size of less than 20 microns "quartz equivalent." The overflow is passed to the thickener 11 as a still further increment of the end product of the method. The underflow from the hydraulic classifier 17 is returned to the hydraulic classifier 12 for recirculation through the flotation cells, hydraulic classifier 15, ball mill 16 and hydraulic classifier 17.

Referring now to flow sheet 1C, it will be appreciated, as above described, the thickener 11 receives the end product of the method in the overflow from hydraulic classifiers 10, 12, 15 and 17, respectively containing solids of a particle size of —20 microns "quartz equivalent" and comprising bitumen containing original colloidal clay and free from silica of particle size greater than about 10 microns. It will be noted that the colloidal clay passing to the thickener will comprise most of the clay natively contained by the crude asphalt, since in the treatment involved agglomerates or balls of clay present in the crude product will be broken up and will pass to the thickener with the overflow from the several hydraulic classifiers.

The underflow from the thickener 11, containing about 45% of total solids which comprises the refined end product of the method is passed to a tank 18, which acts as a surge tank, while the overflow from the thickener comprising water is returned, for recirculation to any point in the process where water is required, for example, to the conditioner 13, since it contains reagents added to the conditioner.

The end product is finally worked up, for example, by passing it from tank 18 through a rotary filter 19, where the water content is reduced to about 35% and the resulting filter cake is washed with fresh water to remove soluble salts and reagents. The water from the rotary filter passes to waste and the cake is transferred to a heated mixer 20, into which flux is introduced. From the mixer 20 the product is passed to a drier 21, for example, a rotary drier, which may be heated by products of combustion, or an open tank, which may be heated, for example, by steam coils. From the drier the product is passed to a dispensing mill, as, for example, a colloid mill, at large clearance and which will desirably be heated, as, for exampe, by steam jacketing. The product, on discharge from the dispersing mill, may be packaged, or transported in melted condition to the point of ultimate use.

If desired, to the underflow from the thickener 11, before it is passed to the rotary filter 19, in, for example tank 18, a small amount of flux may be added. If flux be added at this point, a suitable amount will be about 5% based on the weight of total solids in the underflow.

The refined product obtained by the procedure, according to this invention, described above, will comprise bitumen of the crude Trinidad Lake asphalt together with substantially all of the native contained clay largely in colloidal size and silica of particle size in the main no larger than about 10 microns, the total mineral matter including silica and clay not exceeding about 30% by weight of the refined product, exclusive of such amount of flux as may be added in the mixer 20.

From the above detailed description of the operation of the method of this invention, it will be noted that the method in essence, or broadly, comprises the refining of crude Trinidad Lake asphalt by the separation from the bitumen thereof of mineral matter, primarily silica or quartz, of undesirably large size, i. e., above about 10 microns, while retaining with the bitumen substantially all of the native clay content of the crude, largely in the form of colloidal size particles, by the use of water, or hydraulic separation of particles of less than 20 micron size from a ground mass of the crude asphalt; it having been found that in the hydraulic separation of particles of such size separation of silica of particle size of above about 10 microns from bitumen and clay of desirable size will be effected.

Thus essentially the crude Trinidad Lake asphalt is desirably refined, according to the method of this invention, by grinding for the production of particles of a size of less than 20 microns quartz equivalent and effecting hydraulic classification of such particles and, more specifically, by repeated grinding alternately with hydraulic classification or repeated hydraulic classification, it having been found that by grinding under the conditions I have described, that operation functions selectively in that agglomerates or balls of clay will be broken down with release of colloidal clay, and silica particles of undesirable size will be released in a relatively unground state from the asphalt, such silica particles being also in condition to be removed from the system. Desirably after the grinding some of the quartz, as, for example, quartz of relatively large particle size, for example, 50 mesh and larger, will be removed before the hydraulic classification.

Still more specifically, according to the method of this invention, the crude asphalt having been ground and subjected to hydraulic classification may be subjected to flotation and the concentrate reground and subjected to hydraulic classification.

It will be noted that the hydraulic classification steps involved in the method according to this invention may be accomplished with the use of the hydraulic cyclone instead of with hydraulic classifiers of the type indicated in the foregoing description and the use of such as well as of hydraulic classifiers of the type indicated is contemplated as within the term "hydraulic classification" as used in the appended claims.

It will be appreciated that the above description of the method according to this invention is in the detail given for illustrative purposes, it being apparent that various modifications may be made in detail without departing from the scope of this invention as broadly disclosed herein and from the scope of the appended claims.

What I claim and desire to protect by Letters Patent is:

1. The method of refining Trinidad Lake asphalt which comprises the steps of jigging a ground mass of crude Trinidad Lake asphalt to separate therefrom quartz particles of a size of 50 mesh and greater and subjecting the portion of the jigged mass containing quartz particles of a size less than 50 mesh to hydraulic classification in a hydraulic classifier adjusted to overflow quartz particles of a size less than 20 microns, and bitumen.

2. The method of refining Trinidad Lake asphalt which comprises the steps of jigging a ground mass of crude Trinidad Lake asphalt to separate therefrom quartz particles of a size of 50 mesh and greater, rejecting the portion of the jigged mass containing quartz particles of a size of 50 mesh and greater, subjecting the remaining portion of the jigged mass to classification in a classifier to separate therefrom particles of a size of 50 mesh and greater, subjecting the portion of the classified mass containing particles of a size of less than 50 mesh to hydraulic classification in a hydraulic classifier adjusted to overflow quartz particles of a size less than 20 microns and bitumen, grinding the underflow from the hydraulic classifier and recirculating the resultant ground mass.

3. The method of refining Trinidad Lake asphalt which comprises the steps of jigging a ground mass of crude Trinidad Lake asphalt to separate therefrom quartz particles of a size of 50 mesh and greater, passing the portion of the jigged mass containing quartz particles of the size of less than 50 mesh through a classifier to separate therefrom particles of a size of 50 mesh and greater, subjecting the portion of the classified mass containing quartz particles of the size of less than 50 mesh to hydraulic classification in a hydraulic classifier adjusted to overflow quartz particles of a size less than 20 microns and bitumen, thickening the overflow from the hydraulic classifier and filtering the thickened overflow; subjecting the underflow from the hydraulic classifier to froth flotation, subjecting the flotation concentrate to hydraulic classification in a hydraulic classifier adjusted to overflow quartz particles of a size less than 20 microns and bitumen, thickening the overflow from said hydraulic classifier and filtering the thickened overflow.

4. The method of refining Trinidad Lake asphalt which comprises the steps of jigging a ground mass of crude Trinidad Lake asphalt to separate therefrom quartz particles of a size of 50 mesh and greater, rejecting the portion of the jigged mass containing quartz particles of a size of 50 mesh and greater, passing the remaining portion of the jigged mass through a classifier to separate therefrom particles of a size of 50 mesh and greater, subjecting the portion of the classified mass containing quartz particles of the size of less than 50 mesh to hydraulic classification in a hydraulic classifier adjusted to overflow quartz particles of a size less than 20 microns and bitumen, thickening the overflow from the hydraulic classifier and filtering the thickened overflow; subjecting the underflow from the hydraulic classifier to froth flotation, subjecting the flotation concentrate to hydraulic classification in a hydraulic classifier adjusted to overflow quartz particles of a size less than 20 microns and bitumen, thickening the overflow from said hydraulic classifier and filtering the thickened overflow; grinding the underflow from the last mentioned hydraulic classifier, subjecting the ground mass to hydraulic classification in a hydraulic classifier adjusted to overflow quartz particles of a size less than 20 microns and bitumen, thickening the overflow from said hydraulic classifier, filtering the thickened overflow and recirculating the underflow from said hydraulic classifier through the flotation step.

5. The method of refining Trinidad Lake asphalt which comprises the steps of subjecting a ground mass of crude Trinidad Lake asphalt to hydraulic classification in a hydraulic classifier adjusted to overflow quartz particles of a size less than 20 microns and bitumen.

6. The method of refining Trinidad Lake asphalt according to claim 5, characterized by the fact that the overflow from the hydraulic classifier has a solids concentration within about the range 3%–10%.

7. The method of refining Trinidad Lake asphalt according to claim 5, characterized by the fact that the underflow from the hydraulic classifier is subjected to froth flotation.

8. The method of refining Trinidad Lake asphalt according to claim 5, characterized by the fact that the ground mass of crude Trinidad Lake asphalt comprises largely particles of a size of less than about 50 mesh.

9. The method of refining Trinidad Lake asphalt according to claim 5, characterized by the fact that the overflow from the hydraulic classifier is thickened, flux is added to the thickened overflow and the mixture of thickened overflow and added flux is filtered.

10. The method of refining Trinidad Lake asphalt according to claim 5, characterized by the fact that the underflow from the hydraulic classification is subjected to froth flotation and the flotation concentrate is subjected to grinding and then to hydraulic classification in a hydraulic classifier adjusted to overflow quartz particles of a size less than 20 microns and bitumen.

11. The method of refining Trinidad Lake asphalt according to claim 10, characterized by the fact that the underflow from the second hydraulic classifier is ground and the ground mass subjected to hydraulic classification in a hydraulic classifier adjusted to overflow quartz particles of a size less than 20 microns and bitumen and that underflow from said hydraulic classifier is recirculated through the froth flotation step.

12. The method of refining Trinidad Lake asphalt according to claim 5, characterized by the fact that the overflow from the hydraulic classifier is thickened and filtered.

13. The method of refining Trinidad Lake asphalt according to claim 12, characterized by the fact that flux is added to the filter cake.

HENRY CLAY HOWELL.

REFERENCES CITED

The following references are of record in the file of this patent:

UNITED STATES PATENTS

| Number | Name | Date |
|---|---|---|
| 597,892 | Wilkinson | Jan. 25, 1898 |
| 655,416 | Philippe | Aug. 7, 1900 |
| 931,120 | Heinicke | Aug. 17, 1909 |
| 1,057,667 | Pine | Apr. 1, 1913 |
| 2,453,060 | Bauer | Nov. 2, 1948 |